United States Patent Office 3,316,272
Patented Apr. 25, 1967

3,316,272
HETEROCYCLIC DERIVATIVES OF TRIPHENYL-ETHYLENES, TRIPHENYLETHANES AND TRIPHENYLETHANOLS
Edward McCreery Roberts, George Philip Claxton, and Frances Gertrude Fallon, Cincinnati, Ohio, assignors to Richardson-Merrell Inc., New York, N.Y., a corporation of Delaware
No Drawing. Original application June 27, 1962, Ser. No. 205,551. Divided and this application June 6, 1966, Ser. No. 570,102
5 Claims. (Cl. 260—294.7)

This application is a division of application Serial No. 205,551 filed June 27, 1962.

This invention relates to a series of novel and useful compounds and processes for preparing the same. More particularly, this invention relates to a series of triphenylethanes, triphenylethylenes, and triphenylethanols, in which one of the phenyl groups is substituted with a pyridyl or reduced pyridyl ring which is separated from the aromatic portion of the molecule by an oxygenated alkyl fragment of one, two or three carbon atoms. The invention also includes nontoxic, water-soluble addition salts, quaternary ammonium derivatives and N-oxide derivatives of the new compounds.

The compounds of this invention may be represented by the following formulas:

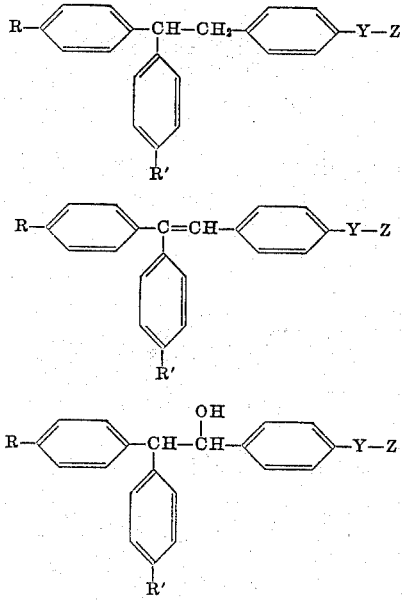

where:
R and R' are hydrogen, chlorine or methoxyl;
Y is an oxygenated carbon fragment chosen from the following:

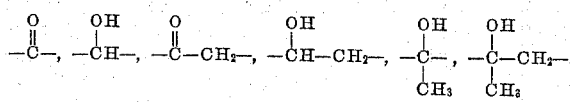

in which the carbon bearing the oxygen is always attached to the phenyl ring;
Z is a pyridyl ring or a partially or completely saturated pyridyl ring which is attached to Y through a ring-carbon atom. The nitrogen of the reduced pyridyl ring bears a hydrogen atom or a lower alkyl substituent.

The compounds of this invention are obtained by treatment of triphenylethylene derivatives of the type:

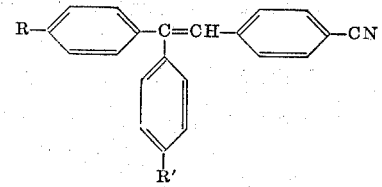

where R and R' are as previously defined, with an appropriate organometallic derivative such as α-picolyl lithium (as in Examples 2 and 5), 3-pyridyl lithium (as in Example 6), or 2-pyridyl lithium (as in Examples 1 and 4). Such treatment is conveniently carried out by mixing the reactants in an inert solvent such as ether, benzene, toluene, or combinations of such inert solvents at appropriate tempertaures chosen in the range of —60° C. to 80° C. The resulting imine is hydrolyzed to the corresponding ketone without being isolated by being mixed with dilute mineral acid at 25°–100° C.

The resulting keto-triphenylethylenes, which will hereinafter be referred to collectively as triphenylethylene-pyridylalkanones, may be seen to have three reactive centers capable of being reduced. These are the ethylenic double bond, the keto group, and the pyridine ring double bonds. By varying the order and extent of the reduction of these reactive centers, a variety of useful compounds may be obtained. Such reductions and the production of useful derivatives of the reduced compounds are discussed in the numbered sections below.

(1) *Reduction of the pyridine ring*

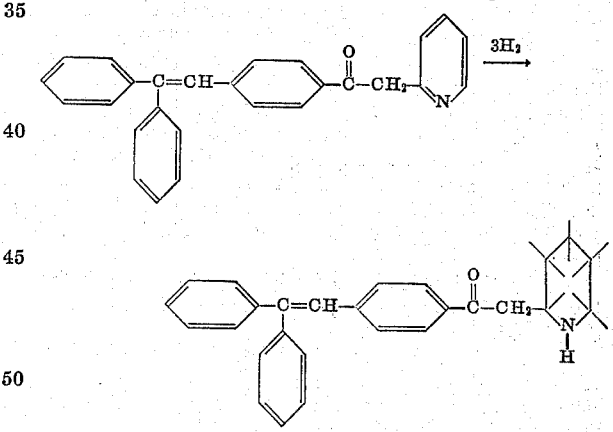

Hydrogenation of the triphenylethylene-pyridylalkanones to the triphenylethylene-piperidylalkanones may be effected at room temperature in an acidic medium in the presence of platinum oxide catalyst at an initial hydrogen pressure of 25–125 lbs./sq. in., as in Examples 8 and 9. The acidic medium may be realized, for instance, by dissolving or suspending:

(a) A mineral acid salt of the triphenylethylene-pyridylalkanone in a suitable polar solvent such as methanol, ethanol, dimethylformamide or acetic acid.

(b) The triphenylethylene-pyridylalkanone in acetic acid.

(c) The triphenylethylene-pyridylalkanone in methanol, ethanol, or dimethylformamide plus enough mineral acid to more than neutralize the organic base.

Under the above described conditions, the uptake of hydrogen slows markedly when the triphenylethylene-piperidylalkanone stage is reached, that is, when three molar-equivalents of hydrogen have been consumed. The reaction may be stopped at this point to give the desired products.

In a completely analogous manner, the hydrogenation of a quaternary salt of a triphenylethylene-pyridylalkanone (such as those in Example 7) may be made to yield a triphenylethylene-N-alkylpiperidylalkanone (as in Example 24).

(2) Reduction of the keto group

The reduction of the keto group, without affecting the pyridine ring unsaturation, may be realized in several ways: to give a secondary alcohol by direct reduction (as in Example 31); or a tertiary alcohol by alkylative reduction (as in Example 3). That is, mixing a triphenylethylene-pyridylalkanone in ethanol or methanol (or a mineral acid salt of such an alkanone in methanol or ethanol plus an equivalent or a slight excess of aqueous base, such as dilute sodium hydroxide) with a complex metal hydride, such as sodium borohydride, yields a secondary triphenylethylene-pyridylalkanol (as in Example 31). Similar results may be achieved under anhydrous conditions by mixing absolute ether or tetrahydrofuran solutions of triphenylethylene-pyridylalkanones and complex metal hydrides such as lithium aluminum hydride. Alkylative reductions are brought about by mixing ether solutions of a triphenylethylene-pyridylalkanone and an organo-metallic reagent such as alkyl-lithium or an alkyl-magnesium halide. This treatment yields a tertiary triphenylethylene-pyridylalkanol as in Example 3.

(3) Reduction of both the pyridine ring and the keto group

The reduction of both the pyridyl ring unsaturation and the keto group of the triphenylethylene-pyridylalkanones leads to triphenylethylene-piperidylalkanols. This two-step reduction may be accomplished in either order, as can be seen from the discussion in the two preceding sections. That is to say, the further reduction of either the triphenylethylene-pyridylalkanols or the triphenylethylene-piperidylalkanones yields triphenylethylene-piperidylalkanols. The same result may be achieved in one step by allowing the triphenylethylene-pyridylalkanones to take up four molar-equivalents of hydrogen in the initially described hydrogenation. More specifically, these triphenylethylene-piperidylalkanols may be obtained as follows:

(a) By hydrogenation of triphenylethylene-pyridylalkanols (as in Example 38) under any of the conditions described in Section (1).

(b) By the reduction of triphenylethylene-piperidylalkanones (as in Examples 12, 13, 34, 37, and the alternate procedure of Example 10) under any of the conditions described in Section (2).

(c) By the hydrogenation of triphenylethylene-pyridylalkanones with four molar-equivalents of hydrogen (as in Examples 10 and 11) under any of the conditions described in Section (1). In this case, the hydrogen uptake is simply allowed to proceed until four molar-equivalents of hydrogen have been consumed.

A special subclass of this stage of reduction is obtained (as in Example 32) when the keto group is reduced and the pyridine ring is only partly reduced. These compounds, triphenylethylene-N-alkyltetrahydro-pyridinealkanols, are obtained by mixing a methanol or ethanol solution of a quaternary salt of a triphenylethylene-pyridylalkanone with one or slightly more than one equivalent of a base, such as dilute sodium hydroxide, and a complex metal hydride, such as sodium borohydride, with or without isolation of the intermediate quaternary enolate formed by treatment of the triphenylethylene-pyridylalkanone quaternary salt with the dilute sodium hydroxide.

(4) Reduction of the pyridine ring, the keto group and the ethylene double bond Compounds in which all three reactive centers of unsaturation are fully reduced to produce triphenylethane-piperidylalkanols may be derived by the further reduction of any of the triphenylethylenes above. In practice, they have been obtained by two general procedures:

(a) The one-step reduction by complete hydrogenation (with five molar-equivalents of hydrogen) of the triphenylethylene-pyridylalkanones (as in Example 14). Such reduction may be carried out in methanol, ethanol, acetic acid, or dimethylformamide in the presence of a catalyst, such as platinum oxide or 10 percent palladium on charcoal, at an appropriate temperature between 25° C. and 80° C. and at an initial hydrogen pressure of 25–125 lbs./sq. in. The necessary acidic medium is attained as described above in Section (1).

(b) The hydrogenation of triphenylethylenepiperidylalkanols as either a free base or a mineral acid salt, dissolved or suspended in methanol, ethanol, acetic acid, or dimethylformamide, in the presence of 10 percent palladium on charcoal at an initial hydrogen pressure of 25–125 lbs./sq. in. Examples of this procedure are shown in Examples 15, 16, 27, 28, and 29.

(5) Preparation of derivatives of piperidylalkanols

A number of useful derivatives can be made by further reaction of the triphenylethylene-piperidylalkanols and the triphenylethane-piperidylalkanols. These are N-alkyl derivatives, N-alkyl-N-oxides, and N,N-dialkylpiperidinium salts.

(a) N-alkyl derivatives

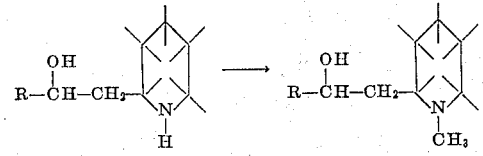

Where R is

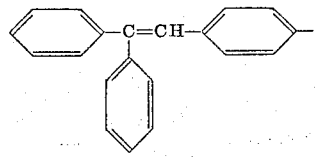

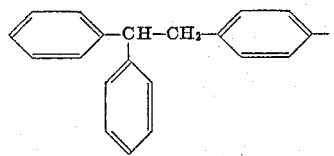

N-alkyl derivatives which resulted from the reduction of triphenylethylene-pyridylalkanone quaternary salts and N-alkyltriphenylethylene-piperidylalkanones are discussed in Sections (1) and (3) above. N-Methylation of the already-reduced triphenylethylene- and triphenylethane-piperidylalkanols may be carried out by heating at reflux a water suspension of the starting piperidylalkanol (or its mineral acid salt plus a molar-equivalent of sodium formate) in the presence of formaldehyde and formic acid (as in Examples 18, 19, 20, 21, 25, 26 and 30).

(b) *N-Alkyl-N-oxide derivatives*

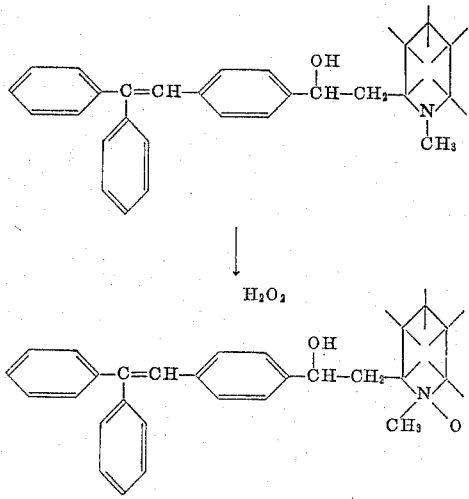

N-Alkyl-N-oxide derivatives are conveniently prepared by the addition of a slight excess of 30 percent hydrogen peroxide to a solution of the N-alkylpiperidine in methanol solution at room temperature (as in Example 22).

(c) *N,N-dialkylpiperidinium salts*

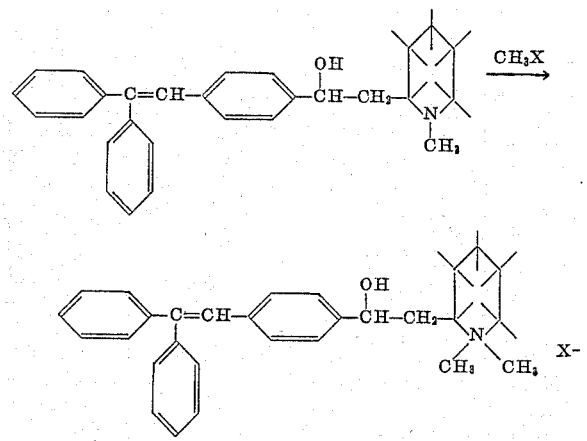

The N,N-dialkylpiperidinium salts may be obtained by heating methanol or ethanol solutions of the N-alkylpiperidines at about 100° C. in closed pressure bottles in the presence of alkylating agent, such as an alkyl halide (as in Example 23).

(6) *Triphenylethanols from triphenylethylenes*

Triphenylethanol-N-alkylpiperidylalkanols may be obtained by hydroboration of the corresponding triphenylethylenes to produce triphenylethylboranes which, without being isolated, may be oxidatively hydrolyzed to the desired triphenylethanols as in Example 36. The triphenylethylborane may be obtained by stirring (at 0°–30° C.) a diglyme solution of the triphenylethylene-N-alkylpiperidylalkanol in the presence of diborane. The diborane may be generated separately and bubbled into the reaction mixture or generated in situ by the dropwise addition of 47 percent boron trifluoride etherate to sodium borohydride in diglyme at or near 0° C. The resulting triphenylethylborane may be oxidized and hydrolyzed by the addition of aqueous hydrogen peroxide and aqueous base, such as dilute sodium hydroxide, to produce a triphenylethanol-N-alkylpiperidylalkanol.

The compounds of the present invention are generally characterized by having peripheral vasodilator and hypotensive physiological activity, and may be useful in the treatment of hypertension and peripheral vascular diseases at daily dosages ranging from 100 to 4,000 mgs. daily by the oral route or somewhat less when administered parenterally. In most cases, the compounds of the specific examples have been found to have this physiological activity. Some of the individual compounds of the specific examples also show additional physiological effects as will be indicated. These include cholesterol depressant, anti-inflammatory, and blood coagulant and anticoagulant activities. A few of the compounds showed slight activity as anabolic agents.

The invention will now be illustrated by a number of specific examples showing the preparation of representative compounds of the present invention.

The method of synthesis of the triphenylethylene nitrile starting materials used here is a modification of that reported by R. E. Allen, E. L. Schumann, W. C. Day and M. G. Van Campen, Jr., J. Am. Chem. Soc., 80, 591 (1958). The modification consists of the use of 1 ml. of 2-methyl-5-ethylpyridine per gram of triphenylethylene bromide as solvent in the cyanide-halogen replacement reaction. All nitriles used herein were reported in the above reference except 1,1 - diphenyl - 2 - p-cyanophenylethylene which was reported by W. Tadros, Y. Akhnookh and G. Aziz in J. Chem. Soc., 1953, 186–9, to melt at 107°–109° C. The sample used here melted at 116°–117° C.

EXAMPLE 1

*1,1-diphenyl-2-[p-(2-pyridylcarbonyl)-phenyl]ethylene*

To 2.46 g. (0.352 mole) of cut-up lithium wire in 150 ml. of absolute ether was slowly added, with stirring, 24.1 g. (0.176 mole) of n-butylbromide. The entire preparative reaction was carried out in a dry nitrogen atmosphere with vigorous stirring. The reaction mixture was cooled to −10° C. in a Dry-Ice acetone bath after the first few drops of n-butylbromide were added. The addition was then completed at −10° C. Stirring was continued at this temperature for 50 minutes. The reaction solution was cooled to −60° C. and treated dropwise (over a 10–15 minute period) with 25.0 g. (0.159 mole) of 2-bromopyridine in 40 ml. of absolute ether. The reaction mixture was stirred at −35° C. for 15 minutes prior to being recooled to −60° C. and treated dropwise with 40.0 g. of 1,1-diphenyl-2-p-cyanophenylethylene in 200 ml. of dry toluene. The latter addition was carried out at such a rate that the temperature did not exceed −50° C. The reaction mixture was then allowed to warm slowly to room temperature over a period of about 2 hours. Water (50 ml.) was added dropwise followed by 60 ml. of 2N sulfuric acid. After standing overnight at room temperature, the aqueous phase was separated and discarded. The solvent of the organic phase was evaporated on the steam bath under reduced pressure to give a residue which was covered with 200 ml. of 10% hydrochloric acid and heated on the steam bath. Neutralization with dilute sodium hydroxide and extraction with five 80 ml. portions of benzene gave a benzene solution of the product which was readily purified by chromatography. The benzene solution (washed with water and dried over sodium sulfate) was poured through a 12 x 12 inch column of alumina. Absolute ether readily eluted the product which was isolated by evaporation of the ether followed by crystallization under low-boiling petroleum ether. The yield of product, M.P. 84°–85.5° C. was 37.68 g. (73% of theory).

This compound had slight anabolic and analgesic activity.

EXAMPLE 2

*1,1-diphenyl-2-[p-pyridylacetyl)-phenyl]-ethylene and its hydrochloride salt*

A solution of picolyl lithium in absolute ether was prepared by the dropwise addition over a one-hour period of 67.0 g. (0.72 mole) of α-picoline to a solution of phenyl lithium in ether. The phenyl lithium had previously been prepared by the dropwise addition over a three hour period 118.0 g. (0.75 mole) of bromobenzene in 350 ml. of absolute ether to 10.4 g. (1.50 moles) of small pieces of lithium wire in 500 ml. of absolute ether.

The resulting picolyl lithium was added to a solution of 37.0 g. (0.67 mole) of 1,1-diphenyl-2-p-cyanophenylethylene in 750 ml. of dry benzene. All of the above additions were carried out with vigorous stirring. The reaction mixture was heated at reflux temperature for two hours and carefully treated with 250 ml. of concentrated hydrochloric acid in 750 ml. of water. The aqueous acid was added slowly while the organic solvent was allowed to boil off. After most of the organic solvent had been evaporated, the reaction mixture was heated on the steam bath for one hour. Most of the water was removed by evaporation under reduced pressure to give the impure, crystalline hydrochloride salt. The product was collected by filtration and recrystallized from acetone. The yield of 1,1-diphenyl-2-[p-(2-pyridylacetyl)phenyl]-ethylene hydrochloride, M.P. 217°–225° C., was 184.3 g. (66.8% of theory).

The melting point of a sample introduced into the melting point bath at 214° C. was found to be 219°–222° C. An analytical sample of the free base, M.P. 120°–123.5° C., was prepared by neutralization in alcohol with dilute sodium hydroxide followed by recrystallization from ether or chloroform.

EXAMPLE 3

*1,1-Diphenyl-2-[p-(1-hydroxy-1-[2-pyridyl]ethyl)phenyl] ethylene and its hydrochloride salt*

A solution of methyl magnesium iodide in about 50 ml. of absolute ether was prepared under nitrogen with vigorous stirring from 11.80 g. (0.083 moles) of methyl iodide and 4.00 g. (0.166 moles) of magnesium turnings. A solution of 1,1-diphenyl-2-[p-(2-pyridylcarbonyl)phenyl]ethylene of Example 1 in 250 ml. of absolute ether was added rapidly from a dropping funnel to the above Grignard reagent. The reaction mixture was stirred at room temperature for two hours and poured onto chipped ice with 200 ml. of saturated ammonium chloride solution. The organic layer was separated, washed with water, dried over sodium sulfate and evaporated to give crude, crystalline 1,1-diphenyl-2-[p-(1-hydroxy-1-[2-pyridyl]ethyl)phenyl]ethylene which on being recrystallized from high-boiling petroleum ether weighed 24.33 g. (100% of theory) and melted at 126°–128.5° C. An analytical sample melted at 125°–126.5° C.

A hydrochloride salt, M.P. 125°–132° C. (as the monohydrate), was prepared in ether solution with alcoholic hydrogen chloride solution.

EXAMPLE 4

*1,1-Di-p-anisyl-2-[p-(2-pyridylcarbonyl)phenyl] ethylene*

According to the method of Example 1, with equivalent amounts of reactants and under identical reaction conditions, 1,1-di-p-anisyl-2-p-cyanophenylethylene was converted to 1,1-di-p-anisyl-2-[p-(2-pyridylcarbonyl)phenyl]ethylene in 34.2% yield. The product here was a yellow oil which was used directly for later preparations without attempts to make a crystalline derivative.

EXAMPLE 5

*1,1-Di-p-chlorophenyl-2-[p-(2-pyridylacetyl)phenyl] ethylene*

According to the procedure of Example 2, with equivalent amounts of reactants, 1,1-di-p-chlorophenyl-2-p-cyanophenylethylene was converted to 1,1-di-p-chlorophenyl-2-[p-(2-pyridylacetyl)phenyl]ethylene, M.P. 131°–133.5° C. in 21.4% yield. In this case, the hydrochloride salt was not isolated but converted directly with dilute sodium hydroxide to the free base which was recrystallized from ether-petroleum ether.

EXAMPLE 6

*1,1-Diphenyl-2-[p-(3-pyridylcarbonyl)phenyl]ethylene and its hydrochloride salt*

According to the procedure of Example 1, with equivalent amounts of reactants, 3-bromopyridine being substituted for the 2-bromopyridine of Example 1, 1,1-diphenyl-2-p-cyanophenylethylene was converted to 1,1-diphenyl-2-[p-(3-pyridylcarbonyl)phenyl]ethylene in 56% yield. The yield given here is that following purification by chromatography as described in Example 1. The product at this point was not crystalline. By means of infra-red spectra the proper fraction was selected and used in subsequent preparations.

For purposes of characterization, a hydrochloride salt, M.P. 206°–208° C., was prepared from an ether solution with alcoholic hydrogen chloride reagent.

EXAMPLE 7

*1,1-Diphenyl-2-[p-(2-pyridylacetyl)phenyl]ethylene methobromide, methiodide, quaternary enolate, and methochloride*

A solution of 9.13 g. (0.024 mole) of 1,1-diphenyl-2-[p-(2-pyridylacetyl)phenyl]ethylene of Example 2 in 50 ml. of absolute ethanol was treated with 10.0 g. of a 50% solution of methyl bromide in methanol. The reaction solution was heated in a closed pressure bottle on a steam bath for 4 hours. The cooled solution was diluted with absolute ether to the cloud point and allowed to crystallize at room temperature. Additional ether was added from time to time until the total volume was about 500 ml. The methobromide salt, M.P. 213°–216° C. after drying, was obtained in 79% yield (9.07 g.).

In an identical manner, with 4 ml. of methyl iodide substituted for the methanolic methyl bromide solution above, the methiodide, M.P. 182°–187° C., was prepared in 90% yield.

Treatment of a methanolic solution of the preceding methiodide with concentrated aqueous sodium hydroxide gave the quaternary enolate, 1-[p-($\beta,\beta$-diphenylvinyl)phenyl]-2-(1-methyl-2-pyridino)ethenolate, M.P. 234°–235° C., in 65% yield.

Treatment of this quaternary enolate in 3:1 methylene chloride-acetone with alcoholic hydrogen chloride gave the methochloride M.P. 234°–235.5° C. in 79% yield. Precipitation of the methochloride is effected by partial evaporation of the methylene chloride.

The methochloride also showed slight blood-coagulant activity.

EXAMPLE 8

*1,1-Diphenyl-2-[p-(2-piperidylacetyl)phenyl] ethylene and its hydrochloride salt*

A suspension of 10.00 g. (0.024 mole) of 1,1-diphenyl-2-[p-(2-pyridylacetyl)phenyl]ethylene hydrochloride of Example 2 in 200 ml. of glacial acetic acid and 1.00 g. of platinum oxide catalyst was subjected to hydrogenation on a Parr shaker apparatus at an initial hydrogen pressure of 36.7 lbs./sq. inch. Hydrogen uptake was stopped after the consumption of three molar-equivalents of hydrogen. The organic material was completely in solution at this point. The catalyst was removed by filtration to give a pale yellow filtrate which was poured onto chipped ice with excess concentrated ammonium hydroxide. The resultant slightly gummy, yellow base was collected by filtration and recrystallized from ether to give 1,1-diphenyl-2-[p-(2-piperidylacetyl)phenyl]ethylene, M.P. 129°–129.5° C., 4.09 g. (42.6% yield). An additional crop of the product as the hydrochloride salt, M.P. 190°–191° C., was obtained by the addition of alcoholic hydrogen chloride to the ether mother liquor. The hydrochloride salt was recrystallized from acetone to give 2.79 g. of product for a total yield of 69.3%.

The hydrogenation, when run at higher starting pressures (in the neighborhood of 125 lbs./sq. inch), produces the above compound plus significant amounts of 1,1-diphenyl-2-[p-(2-piperidylacetyl)phenyl]ethane, M.P. 72–74° C. Its hydrochloride salt melts at 207–208° C.

Similar results were obtained when a 10% solution of the starting material (as its hydrochloride) in dimethyl formamide was subjected to hydrogenation in the presence of platinum oxide catalyst.

This compound also had analgesic, cholesterol depressant, blood coagulant, and anti-inflamatory activity.

EXAMPLE 9

*1,1-Diphenyl-2-[p-(3-piperidylcarbonyl)phenyl] ethylene hydrochloride*

According to the procedure of Example 8, 1,1-diphenyl-2-[p-(3-pyridylcarbonyl)phenyl]ethylene of Example 6 was hydrogenated in acetic acid solution to yield 1,1-diphenyl - 2 - [p - (3 - piperidylcarbonyl)phenyl]ethylene in 62.5% yield. The starting material here was used as the free base rather than the salt, as in the previous Example. The product was isolated as the hydrochloride salt by addition of alcoholic hydrogen chloride solution to a chloroform solution of the crude product. Precipitation of the crude hydrochloride salt was effected by addition of ethyl acetate and evaporation of most of the chloroform. Additional crops were obtained by the addition of absolute ether to the mother liquors. All crops were recrystallized from butanone-ether to give the hydrochloride salt, M.P. 160°–175° C.

This compound also had cholesterol depressant, anti-inflammatory and slight analgesic activity.

EXAMPLE 10

*Two stereoisomeric 1,1 - diphenyl - 2 - [p - (1 - hydroxy-2 - [2 - piperidyl]ethyl)phenyl]ethylenes and their hydrochloride salts*

A solution of 6.50 g. (0.016 mole) of 1,1-diphenyl-2-[p-(2-pyridylacetyl)phenyl]ethylene hydrochloride of Example 2 in 260 ml. of 95% alcohol with 1.00 g. of platinum oxide catalyst was hydrogenated on a Parr shaker at an initial hydrogen pressure of 42.2 lbs./sq. in. After a pressure fall of 5.7 lbs./sq. in., corresponding to the uptake of four molar-equivalents of hydrogen, the reaction was stopped. The catalyst was removed by filtration. The solvent was evaporated from the filtrate under reduced pressure on a steam bath to give a pale yellow oil which readily crystallized in needles from chloroform-ethyl acetate to give a material herein designated product A hydrochloride. The yield of crude product A hydrochloride was 5.19 g. The mother liquors on being left open in an Erlenmeyer flask at room temperature began depositing button-like crystals after one day. After four days of growth, these crystals, designated product B hydrochloride were collected by filtration; weight 0.38 g. Product A hydrochloride was recrystallized from chloroform-ethyl acetate before both products were dried 20 hours at 100° C. under reduced pressure over phosphorous pentoxide. The melting point of product A hydrochloride was found to be 174°–178° C. and that of product B hydrochloride, 168°–173° C. A mixture of the two showed a melting point depression, 157°–172° C. Analysis showed these salts to both be monohydrates.

Products A and B were alternatively produced by the reduction of 1,1-diphenyl-2-[p-(2-piperidylacetyl)phenyl] ethylene of Example 8 with two molar equivalents of sodium borohydride in methanol. Yields obtained by this method were: product A, 28.7%; product B, 20.5%.

The mixture of Products A and B (produced by this alternate procedure) in cold ethyl acetate solution was found to deposit Product B hydrochloride as the first crop and Product A hydrochloride as the second upon addition of a slight excess of alcoholic hydrocholic acid solution. Purification of these isomeric salts was effected by recrystallization from chloroform-ethyl acetate (with a little methanol being added and later removed by evaporation where necessary to bring about complete solution) to give Product A hydrochloride, M.P. 211°–212° C., and Product B hydrochloride, M.P. 212°–213.5° C. The melting points were three or four degrees higher when determined in sealed, evacuated tubes. The melting point of a mixture of the two salts was sharply depressed. The melting points of the free bases obtained by neutralization with dilute sodium hydroxide or ammonium hydroxide were:

Product A, 116.5°–117.5° C.; Product B, 122°–123° C.

EXAMPLE 11

*Two stereoisomeric 1,1-di-p-anisyl-2-[p-(2-piperidylhydroxymethyl)phenyl]ethylene hydrochlorides as the hemihydrates*

A solution of 17.00 g. (0.040 moles) of 1,1-di-p-anisyl-2-[p-(2-pyridylcarbonyl)phenyl]-ethylene of Example 4 in 220 ml. of glacial acetic acid with 0.50 g. of platinum oxide catalyst was subjected to hydrogenation as previously described. As in Example 10, the reaction was stopped after the consumption of four molar-equivalents of hydrogen. The catalyst was removed by filtration. The acetic acid was neutralized with excess dilute sodium hydroxide in chipped ice. The resulting aqueous suspension of the free bases was extracted with chloroform. The chloroform solution was dried over sodium sulfate and made acidic with alcoholic hydrogen chloride. Ethyl acetate was then added and isolation proceeded as with a normal chloroform-ethyl acetate recrystallization. As in Example 10, two diastereoisomeric racemates were obtained: crop 1, designated Product A hydrochloride, 13.06 g., M.P. (as the hemihydrate) 191°–196° C. after first melting at 132°–135° C. and resolidifying at 137° C.; crop 2 obtained by dilution of the mother liquors of crop 1 with absolute ether designated Product B hydrochloride, 1.45 g., M.P. (as the hemihydrate) 129°–140° C. The melting point of a mixture of the two products was sharply depressed: 101°–110° C.

Product A also had anti-inflammatory and cholesterol depressant activity.

EXAMPLE 12

*1,1-di-p-chlorophenyl-2-[p-(1-hydroxy-2-[2-piperidyl]-ethyl)phenyl]ethylene and its hydrochloroide salt*

A solution of 10.28 g. (0.023 moles) of 1,1-di-p-chlorophenyl-2-[p-(2-pyridylacetyl)phenyl]ethylene of Example 5 in 200 ml. glacial acetic acid was reduced according to the procedure of Example 8 to give 1,1-di-p-chlorophenyl - 2 - [p - (2 - piperidylacetyl)phenyl]ethylene. This compound was, without purification, treated in 500 ml. of methanol with 2.00 g. of sodium borohydride. The reaction solution was allowed to stand overnight at room temperature. The reaction mixture was poured into 450 ml. of ice and water containing 10 ml. of 10% sodium hydroxide. The resulting free base was obtained by decantation of the aqueous liquors, washed with water, dissolved in chloroform, dried over sodium sulfate and treated with excess alcoholic hydrogen chloride. Addition of ethyl acetate and partial evaporation of the chloroform in the usual manner gave 7.21 g. (64.0% of theory) of 1,1-di-p-chlorophenyl-2-[p-(1-hydroxy-2-[2-piperidyl]ethyl - phenyl]ethylene hydrochloride, M.P. 210°–218° C. from butanone.

A sample of the free base was formed by treatment of the hydrochloride salt with dilute sodium hydroxide. It was found to melt at 173°–175° C. from ether.

EXAMPLE 13

*1,1-diphenyl-2-[p-(3-piperidylhydroxymethyl)- phenyl]ethylene hydrochloride*

A solution of 23.50 g. (0.065 moles) of 1,1-diphenyl-2-[p-(3-pyridylcarbonyl)phenyl]ethylene of Example 6 was reduced according to the procedure of Example 12.

The intermediate 1,1-diphenyl-2-[p-(3-piperidylcarbonyl)-phenyl]ethylene was purified somewhat by chromatography before being treated with sodium borohydride. A chloroform solution of the compound was introduced on a ¾ x 17 inch column of alumina. The column had been packed in chloroform. Ether was used to elute the column. All material removed from the column by the chloroform and ether was used in the subsequent sodium borohydride reduction to 1,1-diphenyl-2-[p-(3-piperidylhydroxymethyl)phenyl]ethylene. The product was collected as the hydrochloride salt, 7.92 g., M.P. 175°–196° C., formed by the addition of alcoholic hydrogen chloride to an ethyl acetate solution of the free base. By successive recrystallizations from acetone and butanone-methanol, a purified product, M.P. 206°–211° C., was obtained.

EXAMPLE 14

*Two stereoisomeric 1,1-diphenyl-2-[p-(2-piperidylhydroxymethyl)phenyl]ethane hydrochlorides*

A solution of 15.00 g. (0.040 mole) of 1,1-diphenyl-2-[p-(2-pyridylcarbonyl)phenyl]ethylene of Example 1 in 200 ml. of glacial acetic acid with 0.50 g. of platinum oxide catalyst was subjected to hydrogenation on a Parr shaker at an initial hydrogen pressure of 45.0 lbs./sq. in. In this case hydrogenation was allowed to proceed to completion. This treatment resulted in the production of a mixture of ethanes and ethylenes. The ethanes were isolated and separated into the two diastereoisomeric forms as follows: The catalyst was removed by filtration. The acetic acid solution was poured onto a mixture of chipped ice and excess dilute sodium hydroxide. The semi-solid basic product was extracted with ether. The combined ether extracts were washed with water, dried over sodium sulfate, reduced in volume on the steam bath to 300 ml. and refrigerated to give 8.47 g. of crude product, designated product A, M.P. 117°–121° C. Evaporation of the mother liquors to about 100 ml. followed by refrigeration gave a small second crop of semi-solid material which was discarded. Complete evaporation of the mother liquor gave a yellow viscous oil, designated product B. Separate solutions of products A and B in butanone were treated with alcoholic hydrogen chloride and absolute ether to give the salts: product A hydrochloride, M.P. 198°–202° C., 6.63 g.; product B hydrochloride, M.P. 152°–159° C., 2.15 g. Both weights and melting points given here are after successive recrystallizations of the salts from chloroform-ethyl acetate and butanone-ether. Both ethanes obtained here are contaminated with ethylenic material (ultraviolet absorptions: product A hydrochloride, λmax. 302 (E $^{1\%}_{1cm.}$ 186.5); product B hydrochloride λmax. 302 (E $^{1\%}_{1cm.}$ 160.5)).

Pure ethylenic material was not isolated from this preparation.

Alternatively, product A was obtained in good yield without ethylenic contaminants by the following procedure: A solution of 1,1-diphenyl-2-[p-(2-pyridylcarbonyl)phenyl]ethylene of Example 1 in 200 ml. of glacial acetic acid with 1.00 g. of 10% palladium on charcoal catalyst was subjected to hydrogenation at 80° C. on a Parr shaker at an initial hydrogen pressure of 45.0 lbs./sq. in. Hydrogen uptake ceased at the calculated point. The catalyst was removed by filtration. The acetic acid was neutralized by being poured onto chipped ice containing an excess of ammonium hydroxide. The precipitated free base was collected by extraction with chloroform. The chloroform extracts were washed with water dried with sodium sulfate, treated with excess alcoholic hydrogen chloride, and diluted with ethyl acetate. Partial evaporation of the chloroform caused crystallization of the hydrochloride salt. The crystals were allowed to grow after being cooled to room temperature. 1,1-diphenyl-2-[p-(2-piperidylhydroxymethyl)phenyl]ethane hydrochloride, product A hydrochloride, M.P. 199°–204° C., 2.72 g., was collected by filtration. As expected for the pure ethane, this compound showed no ultraviolet absorption maximum in the 300 mμ region.

Both stereoisomers had cholesterol depressant and anti-inflammatory activity.

EXAMPLE 15

*1,1-diphenyl-2-[p-(1-hydroxy-2-[2-piperidyl]-ethyl)phenyl]ethane and its acid maleate salt*

A solution of 6.80 g. (0.017 mole) of 1,1-diphenyl-2-[p-(1-hydroxy-2-[2-piperidyl]ethyl)phenyl]ethylene, product B of Example 10, in 150 ml. of 1:1 alcohol-dimethylformamide with 0.10 g. of 10% palladium on charcoal catalyst was subjected to hydrogenation on a Parr shaker at an initial hydrogen pressure of 47.0 lbs./sq. inch. Hydrogen uptake ceased after the consumption of one molar equivalent of hydrogen. The catalyst was removed by filtration. The filtrate was poured into a mixture of ice and water to form a stable milk. The milky suspension yielded white needle crystals within a few minutes after being covered with a few ml. of low boiling petroleum ether. Filtration gave 6.06 g. of crude 1,1-diphenyl-2-[p-(1-hydroxy-2-[2-piperidyl]ethyl)phenyl]ethane, M.P. 123°–125° C. An analytical sample from ether-high boiling petroleum ether melted at 129.5°–130° C. The acid maleate salt, M.P. 135°–137° C., was formed from an ether solution of the analytically pure free base.

This compound also had cholesterol depressant activity.

EXAMPLE 16

*1,1-diphenyl-2-[p-(1-hydroxy-2-[2-piperidyl]-ethyl)phenyl]ethane*

A suspension of 0.70 g. of 1,1-diphenyl-2-[p-(1-hydroxy-2-[2-piperidyl]ethyl)phenyl]ethylene, product A of Example 10, in 150 ml. of 95% alcohol with 0.10 g. of 10% palladium on charcoal catalyst was subjected to hydrogenation on a Parr shaker at an initial hydrogen pressure of 22.0 lbs./sq. inch. Hydrogen uptake ceased after the consumption of one molar-equivalent of hydrogen. The catalyst was removed by filtration. The filtrate was poured into chipped ice and water to give the crystalline free base, M.P. 120°–125° C., 0.55 g. The product was dissolved in 800 ml. of low boiling petroleum ether, filtered and refrigerated to give the pure 1,1-diphenyl-2-[p-(1-hydroxy-2-[2-piperidyl]ethyl)phenyl]ethane, M.P. 129.5°–130.5° C., 0.30 g. A very small amount of ethylenic contaminant was indicated by the ultraviolet absorption:

λ max. 302, E $^{1\%}_{1cm.}$ 48.2

EXAMPLE 17

*1,1-diphenyl-2-[p-(1-hydroxy-1-[2-piperidyl]-ethyl)phenyl]ethane and its succinate*

A solution of 15.00 g. (0.040 mole) 1,1-diphenyl-2-[p-(1-hydroxy-1-[2-pyridyl]ethyl)-phenyl]ethylene of Example 3 in 250 ml. of methanol with 10 ml. of glacial acetic acid and 2.00 g. of platinum oxide catalyst was subjected to hydrogenation on a Parr shaker at an initial hydrogen pressure of 45.0 lbs./sq. in. The hydrogenation here was run under forcing conditions: 44 hrs. of shaking with heating at 60°–70° C. for 16 of the 44 hours. This was followed by 7 hrs. of shaking (6 hrs, with heat applied) in the presence of 1.00 g. of 10% palladium on charcoal catalyst to effect the uptake of four molar-equivalents of hydrogen. The catalyst was removed by filtration. The methanol was evaporated on a steam bath under reduced pressure to give a clear, colorless oil which was taken up in ether and shaken with dilute sodium hydroxide to neutralize the acetic acid present. The ether solution was washed with water, dried over sodium sulfate and evaporated to give an oil which crystallized readily under high-boiling petroleum ether. The free base, 9.74 g., M.P. 108°–114° C., in 365 ml. of absolute ether was converted to the neutral succinate salt by addition to 3.32 g. of succinic acid in 1.5 l. of absolute ether. The unfilterable gelatinous salt was obtained by evaporation of the ether on the steam bath. The solid residue was dissolved in 1 l. of boiling absolute ethanol, filtered and allowed to crystallize at room temperature. Long needles of the salt were collected by filtration. A second crop was obtained by addition of 3.5 l. of absolute ether to the filtrate. The two crops were combined and dried in a vacuum dessicator to give 5.74 g. of 1,1-diphenyl-2-[p-(1-hydroxy-1-[2-piperidyl]ethyl) phenyl]ethane succinate, M.P. 213°–216.5° C.

EXAMPLE 18

*1,1-diphenyl-2-[p-(1-methyl-2-piperidyl-hydroxymethyl) phenyl]ethylene hydrochloride*

A mixture of 1.47 g. (0.022 mole) of sodium formate, 3.00 g. (0.066 mole) of formic acid (98–100%), 2.60 g. (0.085 equivalent) of paraformaldehyde, 17.5 g. (0.972 mole) of water and 8.78 g. (0.022 mole) of product A hydrochloride of Example 14 containing ethylenic contaminant (M.P. 200°–208° C.) was refluxed overnight. The reaction mixture was cooled and made strongly basic with 125 ml. of dilute sodium hydroxide. The precipitated organic base was extracted with chloroform, washed with water and dried over sodium sulfate. The chloroform was evaporated to give a residual oil which was dissolved in 70 ml. of butanone and treated with excess alcoholic hydrogen chloride. A heavy precipitate of white crystalline salt was quickly obtained at room temperature. The salt, 1,1-diphenyl-2-[p-(1-methyl-2-piperidylhydroxymethyl)phenyl]ethylene hydrochloride, 5.78 g., M.P. 262.5°–265° C., showed strong absorption in the ultraviolet typical of the triphenylethylene system:

$\lambda$ max. 301, $E_{1cm.}^{1\%}$ 479.2

This compound also had anti-inflammatory activity.

EXAMPLE 19

*1,1-di-p-anisyl-2-[p-(1-methyl-2-piperidylhydroxymethyl) phenyl]ethylene hydrochloride*

According to the method of Example 18, 4.74 g. (0.010 mole) of 1,1-di-p-anisyl-2-[p-(2-piperidylhydroxymethyl) phenyl]ethylene hydrochloride, product B hydrochloride of Example 11, was alkylated to form 1,1-di-p-anisyl-2-[p-(1 - methyl - 2 - piperidylhydroxymethyl)phenyl]ethylene. The hydrochloride salt was formed by treatment of the chloroform extract of the organic base with excess alcoholic hydrogen chloride. Crystallization was effected by the addition of ethyl acetate and partial evaporation of the chloroform. The hydrochloride salt, M.P. 203°–209° C., weighed 3.68 g. (76.7% of theory).

This compound also had cholesterol depressant, blood anti-coagulant, and anti-inflammatory activity.

EXAMPLE 20

*1,1-diphenyl-2-[p-(1-hydroxy-2-[1-methyl-2-piperidyl] ethyl)phenyl]ethylene*

According to the procedure of Example 25, 2.09 g. of 1,1 - diphenyl - 2 - [p-(1-hydroxy-2[2-piperidyl]ethyl) phenyl]ethylene, product B of Example 10, was converted to 1.68 g. (78% of theory) of 1,1-diphenyl-2-[p-(1-hydroxy - 2-[1 - methyl-2-piperidyl]ethyl)phenyl]ethylene, M.P. 126°–127° C., after one recrystallization from low boiling petroleum ether.

EXAMPLE 21

*1,1-diphenyl-2-[p-(1-hydroxy-2-[1-methyl-2-piperidyl] ethyl)phenyl]ethylene*

According to the method of Example 18, 3.75 g. of 1,1 - diphenyl - 2 - [p-(1-hydroxy-2-[2-piperidyl]ethyl) phenyl[ethylene hydrochloride, product. A hydrochloride of Example 10, was converted to 3.23 g. (91% of theory) of 1,1 - diphenyl-2-[p-(1-hydroxy-2-[1-methyl-2-piperidyl]ethyl)phenyl]ethylene, M.P. 123.5°–124° C. The dihydrogen citrate salt, formed from butanone solution, melted at 120°–121° C.

This compound also had cholesterol depressant and anti-inflammatory activity.

EXAMPLE 22

*1,1-diphenyl-2-[p-(1-hydroxy-2-[1-methyl-2-piperidyl] ethyl)phenyl]ethylene N-oxide hydrochloride*

A solution of 4.00 g. (0.009 mole) of 1,1-diphenyl-2-[p - (1 - hydroxy - 2 - [1-methyl-2-piperidyl]-ethyl) phenyl]ethylene of Example 21 in 85 ml. of methanol was treated with 1.3 ml. of 30% hydrogen peroxide. The reaction solution was allowed to stand at room temperature for 20 hours. Platinum oxide catalyst was added to decompose the excess hydrogen peroxide. This was allowed to stand for 4 hours before gentle warming on the steam bath for 0.5 hours was carried out to complete the peroxide decomposition. The methanol was evaporated on the steam bath under reduced pressure to give a pale oil, soluble in methanol and difficulty soluble in ether. An acetone solution of the oil was diluted with ether and treated with excess alcoholic hydrogen chloride. The higroscopic 1,1-diphenyl-2-[p-(1-hydroxy-2-[1-methyl-2-piperidyl]ethyl)phenyl]ethylene N-oxide hydrochloride precipitated as a hydrated salt weighing 3.13 g. An analytical sample was dried over phosphorous pentoxide at 0.8 mm. pressure at 83° C. for 16 hrs. to give nearly anhydrous material, M.P. 116°–118° C.

EXAMPLE 23

*1,1-diphenyl-2-[p-(1-hydroxy-2-[1-methyl-2-piperidyl] ethyl)phenyl]ethylene methiodide*

A solution of 3.07 g. (0.008 mol) of 1,1-diphenyl-2-[p-(1-hydroxy - 2 - [1 - methyl-2-piperidyl]ethyl)phenyl ethylene of Example 21 in 40 ml. of methanol was treated with 1.0 ml. of methyl iodide. The reaction solution was heated on a steam bath in a closed pressure bottle for 4 hrs. The reaction solution was cooled and diluted with 250 ml. of absolute ether to give a brown oily precipitate. The ether was decanted, atnd the oil was covered with low boiling petroleum ether. The oil quickly solidified under these conditions to give 2.37 g. (56.8% of theory) of the brownish methiodide derivative. The methiodide was not crystalline and gave no characteristic melting point. A melting point sample flowed in the neighborhood of 130° C. As expected, a water solution of this methiodide gave no precipitate when treated with either dilute hydrochloric acid or dilute sodium hydroxide.

This compound also had anti-inflammatory activity.

EXAMPLE 24

*1,1-diphenyl-2-[p-(1-methyl-2-piperidyl-acetyl)phenyl] ethylene hydrochloride*

A solution of 10.00 g. of the quaternary methiodide of Example 7 in 200 ml. of dimethylformamide was subjected to hydrogenation on a Parr shaker in the presence of 1.00 g. of platinum oxide catalyst. The reaction was stopped after the uptake of three molar-equivalents of hydrogen. The catalyst was removed by filtration and the filtrate was poured onto chipped ice to yield a semi-solid free base. The supernatant aqueous phase was removed by decantation. The product was dissolved in 60 ml. of ethyl acetate, washed with water and then dried over sodium sulfate. The ethyl acetate solution was diluted with one liter of absolute ether and treated with excess alcoholic hydrogen chloride to give 1,1-diphenyl-2-[p-(1-methyl-2-piperidylacetyl)phenyl]ethylene hydrochloride hemihydrate, 4.62 g. (54% of theory), M.P. 165°–170° C. A purer product was obtained by chromatographic purification of the regenerated free base on an alumina column with absolute ether. A small amount of impurity moved off the column with the solvent front followed by

EXAMPLE 25

*1,1-diphenyl-2-[p-(1-hydroxy-1-[1-methyl-2-piperidyl]ethyl)phenyl]ethane acid succinate monohydrate*

A mixture of 6.14 g. (0.016 mol) of 1,1-diphenyl-2-[p-(1 - hydroxy-1-[2 - piperidyl]ethyl)phenyl]ethane of Example 17, 1.91 g. (0.064 equivalents) of paraformaldehyde, 2.19 g. (0.048 mol) of formic acid (98–100%) and 12.9 g. (0.72 mol) of water was heated at reflux temperature overnight. The reaction mixture was cooled and poured into 125 ml. of dilute sodium hydroxide. The precipitated organic base was extracted with chloroform, washed with water and dried over sodium sulfate. The chloroform was evaporated to give a pale yellow oil which was dissolved in 100 ml. butanone, filtered, and made acidic with a solution of 1.88 g. (0.016 mol) of succinic acid in 100 ml. of hot butanone. Dilution of the butanone solution with 2 l. of absolute ether followed by refrigeration yielded 3.07 g. (35.6% theory) of 1,1-diphenyl-2-[p-(1-hydroxy-1-[1-methyl - 2 - piperidyl]ethyl)phenyl]ethane acid succinate monohydrate, M.P. 74°–75° C. after drying over phosphorous pentoxide at 0.5 mm. pressure at 55° C. for 27 hours.

EXAMPLE 26

*1,1-diphenyl-2-[p-(1-methyl-2-piperidylhydroxymethyl)phenyl]ethane hydrochloride*

According to the procedure of Example 25, 4.20 g. (0.011 mole) of 1,1-diphenyl-2-[p-(2-piperidylhydroxymethyl)phenyl]ethane, product B of Example 14, was converted in 14.4% yield to 1,1-diphenyl-2-[p-(1-methyl - 2 - piperidylhydroxymethyl)phenyl]ethane hydrochloride, M.P. 250°–255° C., after recrystallization from chloroform-ethyl acetate. The hydrochloride salt was originally prepared in ethyl acetate solution with excess alcoholic hydrogen chloride. By means of the chloroform-ethyl acetate recrystallization, 1.59 g. (33% of theory) of the starting un-alkylated piperidine was recovered.

EXAMPLE 27

*1,1-diphenyl-2-[p-(1-methyl-2-piperidylhydroxymethyl)phenyl]ethane and its hydrochloride salt*

A solution of 2.30 g. (0.005 mole) of 1,1-diphenyl-2-[p - (1-methyl-2-piperidylhydroxymethyl)phenyl]ethylene of Example 18 as the hydrobromide salt, M.P. 252°–257° C., in 150 ml. of absolute ethanol and 100 ml. of glacial acetic acid with 1.00 g. of 10% palladium on charcoal catalyst was subjected to hydrogenation on a Parr shaker at an initial hydrogen pressure of 45.0 lbs./sq. in. After 4 hrs. at 80° C. the hydrogen uptake corresponded to one molar-equivalent. No further uptake was observable. The catalyst was removed by filtration, and the filtrate was reduced in volume to about 100 ml. on the steam bath under vacuum. The solution was then poured into chipped ice containing excess ammonium hydroxide to precipitate the organic free base. The solid was collected by filtration, washed with water, and air-dried to give the free base, M.P. 72°–80° C. from petroleum ether. The base was dissolved in 70 ml. of butanone and treated with excess alcoholic hydrogen chloride. After standing overnight at room temperature, 1.36 g. of 1,1-diphenyl-2-[p-(1-methyl-2-piperidylhydroxymethyl)phenyl]ethane hydrochloride, M.P. 266.5°–269° C. had precipitated. This represents a crude yield of 65.1%. The pure hydrochloride salt, M.P. 268.5°–271° C., was obtained from absolute ethanol-ethyl acetate.

EXAMPLE 28

*1,1-diphenyl-2-[p-(1-hydroxy-2-[1-methyl-2-piperidyl]ethyl)phenyl]ethane*

According to the procedure of Example 15, 7.60 g. (0.019 mole) of 1,1-diphenyl-2-[p-(1 - hydroxy-2-[1-methyl-2-piperidyl]ethyl)phenyl]ethylene of Example 21 was hydrogenated to give 1.25 g. (16.4% of theory) of pure 1,1-diphenyl-2-[p-(1-hydroxy-2-[1 - methyl-2-piperidyl]ethyl)phenyl]ethane, M.P. 108°–109° C. from acetone.

This compound also had cholesterol depressant activity.

EXAMPLE 29

*1,1-diphenyl-2-[p-(1-hydroxy-2-[1-methyl-2-piperidyl]ethyl)phenyl]ethane*

According to the procedure of Example 15, 7.10 g. of 1,1-diphenyl-2-[p-(1-hydroxy-2-[1-methyl-2-piperidyl]ethyl)phenyl]ethylene of Example 20 was converted to 5.39 g. (75.6% of theory) of 1,1-diphenyl-2-[p-(1-hydroxy-2-[1-methyl-2-piperidyl]ethyl)phenyl]ethane, M.P. 118°–119° C. An analytical sample from ether-petroleum ether melted at 118°–119.5° C.

This compound also had cholesterol depressant and anti-inflammatory activity.

EXAMPLE 30

*1,1-diphenyl-2-[p-(1-methyl-3-piperidylhydroxymethyl)phenyl]ethylene hydrochloride*

According to the method of Example 18, 4.6 g. (0.011 mole) of 1,1-diphenyl-2-[p-(3-piperidylhydroxymethyl)phenyl]ethylene hydrochloride of Example 13 was alkylated to form 1,1-diphenyl-2-[p-(1-methyl-3-piperidylhydroxymethyl)phenyl]ethylene. The free base was extracted with ether from the basified reaction mixture plus ice water. Evaporation of the ether gave the free base as an oil which was dissolved in butanone and treated with excess alcoholic hydrogen chloride to give 2.40 g. of the desired hydrochloride, M.P. 207°–211° C. An analytical sample melted at 217.5°–220° C. (from butanone).

EXAMPLE 31

*1,1-diphenyl-2-[p-(1-hydroxy-2-[2-pyridyl]ethyl)phenyl]ethylene and its hydrochloride salt*

A solution of 5.00 g. of 1,1-diphenyl-2-[p-(2-pyridylacetyl)phenyl]ethylene of Example 2 in 1.5 liters of 2:1 ether-methanol plus 10 ml. of 10% sodium hydroxide was treated with 2.00 g. of sodium borohydride. The reaction solution was allowed to stand at room temperature for 5 hrs. and was then poured onto 1.5 l. of crushed ice. The organic layer was separated, washed with water, dried over sodium sulfate and evaporated to give a yellow oil which crystallized readily from methanol in 82% yield (3.75 g.). The crystalline free base, 1,1-diphenyl-2-[p-(1-hydroxy-2-[2-pyridyl]ethyl)phenyl]ethylene, M.P. 119–121° C., gave a hydrochloride salt, M.P. 183°–185° C. from absolute ether, with alcoholic hydrogen chloride.

This compound also had cholesterol depressant and anti-inflammatory activity.

EXAMPLE 32

*1,1-diphenyl-2-[p-(1-hydroxy-2-[1-methyltetrahydro-2-pyridyl]ethyl)phenyl]ethylene*

A solution of 1.72 g. of the quaternary enolate of Example 7 in 600 ml. of diglyme plus 10 ml. of 10% sodium hydroxide was treated with 2.00 g. of sodium borohydride and allowed to stand overnight at room temperature. The reaction solution was poured onto 1.7 liters of crushed ice. The product was extracted with ether, washed thoroughly with water, dried over sodium sulfate and filtered. The filtrate was evaporated to near dryness and allowed to crystallize at room temperature. The crystals, 0.62 g. of clusters of clear yellow prisms, were the desired 1,1-diphenyl-2-[p-(1-hydroxy-2-[1-methyltetrahydro - 2 pyridyl]ethyl)phenyl]ethylene, M.P. 127°–131° C.

EXAMPLE 33

*1,1 - di-p-chlorophenyl-2-[p-(1-hydroxy-2-[1-methyl-2-piperidyl]ethyl)phenyl]ethylene and its dihydrogen citrate salt*

According to the method of Example 25, 3.2 g. of the dichloro-alcohol of Example 12 was converted to 3.3 g. of 1,1 - di-p-chlorophenyl-2-[p-(1-hydroxy-2-[1-methyl-2-piperidyl]ethyl)phenyl]ethylene, which was isolated as its dihydrogen citrate salt, M.P. 78° C.

EXAMPLE 34

*1,1 - diphenyl-2-[p-(1-hydroxy-1-methyl-2-[1-methyl-2-piperidyl]ethyl)phenyl]ethylene and its dihydrogen citrate salt*

According to the procedure of Example 3, 3.88 g. of the ketone of Example 8 was converted to 3.36 g. of 1,1-diphenyl-2-[p-(1-hydroxy-1-methyl-2-[2 - piperidyl] ethyl)phenyl]ethylene, which without purification was converted by the procedure of Example 25 to 1,1-diphenyl-2-[p-(1-hydroxy-1-methyl-2-[1-methyl - 2 - piperidyl] ethyl)phenyl]ethylene. The compound was conveniently isolated as its dihydrogen citrate sesquihydrate. After drying, the anhydrous salt had an indefinite melting point around 110° C.

EXAMPLE 35

*1,1-diphenyl-2-[p-(1-methyl-3-piperidylacetyl)phenyl] ethylene dihydrogen citrate*

A solution of 1-methyl-3-piperidylmethyl magnesium chloride in tetrahydrofuran was prepared by the dropwise addition of 7.38 g. (0.05 mole) of 3-chloromethyl-1-methylpiperidine in 25 ml. of dry tetrahydrofuran to a vigorously stirred mixture of 1.2 g. (0.05 mole) of magnesium turnings, a few drops of ethyl bromide and about 1 g. of calcium hydride in 50 ml. of tetrahydrofuran. After the completion of the addition, the mixture was stirred vigorously at reflux for 3 hours.

1,1 - diphenyl-2-p-formylphenylethylene (M.P. 96.5°–98.5° C.) was prepared by a Stephen's reduction of 1,1-diphenyl-2-p-cyanophenylethylene with stannous chloride in the usual manner.

The above Grignard solution was added dropwise with vigorous stirring to a solution of 13.00 g. (0.046 mole) of 1,1-diphenyl-2-p-formylphenylethylene in 50 ml. of dry tetrahydrofuran. After the addition was complete, the mixture was heated at reflux with stirring for one hour and then let stand overnight at room temperature. The tetrahydrofuran was evaporated under vacuum. Ether (200 ml.) was added to the residue followed by 150 ml. of saturated ammonium chloride solution. The ether layer was separated, washed thoroughly with water and dried over sodium sulfate. Addition of excess alcoholic hydrogen chloride brought about the precipitation of an oily hydrochloride salt. The oil was reconverted to the free base with dilute sodium hydroxide and passed through a column of alumina with benzene-ether elutant. The chromatographed free base was treated in butanone solution with excess critic acid, also in butanone, to give 5.27 g. of 1,1-diphenyl-2-[p-(1-methyl - 3 - piperidylacetyl) phenly]ethylene dihydrogen citrate (M.P. 142°–148° C., after one recrystallization from butanone).

This compound also had cholesterol depressant, blood anti-coagulant and anti-inflammatory activity.

EXAMPLE 36

*1,1-diphenyl-2-[p-(1-hydroxy-2-[1-methyl-2piperidyl] ethyl)phenyl]-2-ethanol acid maleate*

A solution of 5.94 g. (0.015 mole) of 1,1-diphenyl-2 - [p-(1-hydroxy-2-[1-methyl-2-piperidyl]ethyl)phenyl] ethylene of Example 21 in 50 ml. of diglyme was allowed to react with diborane at room temperature for 18 hours. The diborane was generated in situ by the addition of 1.54 g. of sodium borohydride (0.041 mole) followed by cooling in an ice bath and the dropwise addition of 3.67 g. (0.054 mole) of boron trifluoride (as the boron trifluoride etherate, 47%). The reaction mixture was stirred during the addition of the boron trifluoride etherate and for an additional 2 hrs. while the mixture warmed up to room temperature.

After the reaction period at room temperature, 10 ml. of water, 20 ml. of 3 N sodium hydroxide, and 20 ml. of 30% hydrogen peroxide were added with stirring. The ensuing reaction was allowed to proceed for 15 minutes. Heat was applied occasionally, and cold water was used when necessary to keep the reaction from becoming too viborous. An additional 70 ml. of 3 N sodium hydroxide was then added, and the reaction mixture was stirred for 3 hours. The reaction mixture was diluted further with water and extracted with ether. The ether extract was washed thoroughly with water and evaporated to give 1.13 g. of the free base, a pale amber oil. The oxidative hydrolysis is repeated at this point if a little of the oil boiled in a test tube in methanol with few drops of sulfuric acid forms methyl borate. Methyl borate burns with a green flame and is detected by igniting the vapors above the boiling methanol. If such a test is negative, the oily free base is dissolved in warm butanone and added to an absolute ether solution of excess maleic acid to give 1,1-diphenyl-2-[p-(1-hydroxy - 2 - [1 - methyl - 2 - piperidyl] ethyl)phenyl]-2-ethanol acid maleate, which after drying in a vacuum desiccator over phosphorous pentoxide melts at about 55° C.

EXAMPLE 37

*1,1-diphenyl-2-[p-(1-hydroxy-2-[1-methyl-3-piperidyl]ethyl)phenyl]ethylene*

According to the sodium borohydride reduction procedure of Example 12, the ketone of Example 35 was converted to 1,1, - diphenyl-2-[p-(1-hydroxy-2-[1-methyl-3-piperidyl]ethyl)phenyl]ethylene. The compound was isolated as the acid maleate salt, monohydrate, M.P. 71°–74° C.

EXAMPLE 38

*Two stereoisomeric 1,1 - diphenyl - 2 - [p - (1 - hydroxy-2-[2-piperidyl]ethyl)phenyl]ethylenes and their hydrochloride salts*

A solution of 75,90 g. of 1,1-diphenyl121[p-(1-hydroxy-2-[2-pyridyl]ethyl)phenyl]ethylene of Example 31 in 600 ml. of dimethylformamide was treated with 30 ml. of a 25% solution of hydrogen chloride in ethanol and subjected to hydrogenation on a Parr shaker in the presence of 4.50 g. of platinum oxide catalyst. The initial hydrogen pressure was commonly in the range of 40–55 lbs./sq. inch. The reduction was stopped after the uptake of three molar-equivalents of hydrogen. The crude free base was isolated in the usual manner. The total yield of the crude free base was dissolved in 1230 ml. of ethyl acetate and treated with 39 ml. of alcoholic hydrogen chloride. Crystallization at room temperature gave 75.66 g. of hydrochloride salt, M.P. 193.5°–194° C. Separation of the product into its diastereoisomeric components was effected by recrystallization from a 1:5:10 mixture of methanol-ethyl acetate-chloroform. The solution was boiled and allowed to evaporate until crystallization began. The first crop proved to be product A hydrochloride of Example 10, 58.50 g., M.P. 210°–210.5° C. Subsequent crops, obtained by further evaporation of the mother liquors, proved to be product B hydrochloride of Example 10, 18.13 g., M.P. 211–212° C. The corresponding free bases obtained here were: product A, M.P. 114–116° C., and product B, M.P. 122–123.5° C.

We claim:
1. Compounds of the group consisting of those having the general formulas:

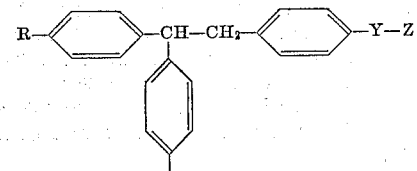

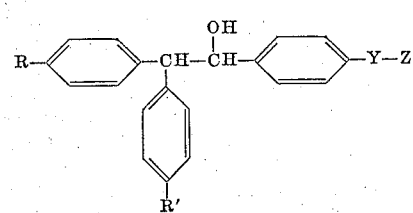

in which R and R' are members of the group consisting of hydrogen, chlorine and methoxy; Y is an oxygenated carbon fragment chosen from the group consisting of:

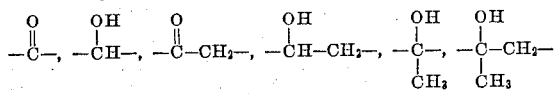

in which the carbon bearing the oxygen is always attached to the phenyl ring; Z is a member of the group consisting of pyridyl, partially saturated pyridyl radicals and completely saturated pyridyl radicals, attached to Y through a ring-carbon atom, the nitrogen atom of said partially saturated and completely saturated pyridyl ring bearing a member of the group consisting of hydrogen and lower alkyl radicals.

2. 1,1 - diphenyl - 2 - [p-(2-piperidylhydroxymethyl)phenyl]ethane.

3. 1,1-diphenyl-2-{p-[1-hydroxy-2-(2 - piperidyl)ethyl]phenyl}ethane.

4. 1,1 - diphenyl - 2 - {p - [1 - hydroxy-2-(1-methyl-2-piperidyl)ethyl]phenyl}ethane.

5. 2,2 - diphenyl - 1 - {p - [1-hydroxy-2-(1-methyl-2-piperidyl)ethyl]phenyl}ethanol.

References Cited by the Examiner
UNITED STATES PATENTS 2,914,529  11/1959  Allen et al. _____ 260—294.7
3,056,797  10/1962  Shapiro et al. _____ 260—297
3,123,643  3/1964  Palopoli et al. _____ 260—294.7

WALTER A. MODANCE, *Primary Examiner.*
AVROM D. SPEVACK, *Assistant Examiner.*